United States Patent [19]

Wolf

[11] 4,238,326

[45] Dec. 9, 1980

[54] FLUID PROCESSOR APPARATUS AND METHOD

[76] Inventor: Bernard A. Wolf, #130, 2738 Roosevelt Blvd., Clearwater, Fla. 33520

[21] Appl. No.: 77,567

[22] Filed: Sep. 21, 1979

[51] Int. Cl.³ .............................................. B01D 35/06
[52] U.S. Cl. .................................... 210/695; 210/42 S; 210/233; 210/243; 210/259; 210/316; 210/708; 210/748; 204/186
[58] Field of Search ..................... 210/24, 23 R, 42 S, 210/73 R, 73 W, 222, 223, 243, 259, 316, 266, DIG. 5; 204/186, 188, 191

[56] References Cited

U.S. PATENT DOCUMENTS

| | | | |
|---|---|---|---|
| 1,095,893 | 5/1914 | Landreth | 210/222 X |
| 1,996,106 | 4/1935 | Halz | 210/223 |
| 3,196,095 | 7/1965 | Wadsworth | 204/149 |
| 3,252,885 | 5/1966 | Griswold | 204/302 |
| 3,398,082 | 8/1968 | Lochmann et al. | 210/223 X |
| 3,412,002 | 11/1968 | Hubby | 204/180 |
| 3,466,154 | 9/1969 | Hori et al. | 210/222 X |
| 3,484,362 | 12/1969 | Uroonhourn | 204/302 |
| 3,544,441 | 12/1970 | Griswold | 204/186 |
| 3,679,556 | 7/1972 | Doeurnspeck | 204/269 |
| 3,703,958 | 11/1972 | Kolm | 210/65 |
| 3,729,402 | 4/1973 | Griswold | 204/302 |
| 3,838,773 | 10/1974 | Kolm | 210/223 X |
| 3,852,178 | 12/1974 | Griswold | 204/186 |
| 3,891,528 | 6/1975 | Griswold | 204/186 |
| 4,059,498 | 11/1977 | Crissman et al. | 204/188 |
| 4,155,924 | 5/1979 | Landis | 210/243 X |

*Primary Examiner*—John Adee
*Attorney, Agent, or Firm*—William A. Newton

[57] ABSTRACT

Disclosed is a fluid processing apparatus and method wherein a plurality of alternating, permanently magnetic cathode plates and anode plates having applied thereto frequency controlled, square wave pulses superimposed over a constant base voltage so as to create an electric field which is substantially perpendicular to the magnetic field of the cathode plates. An alternative embodiment includes a centrally disposed electromagnet for creating a second magnetic field. A downstream water coalescer and molecular sieve are optionally employed depending upon the intended use of the apparatus and method.

18 Claims, 4 Drawing Figures

FLUID PROCESSOR APPARATUS AND METHOD

FIELD OF THE INVENTION

The present invention relates to a fluid processing apparatus and method using electrostatic and magnetic fields for the removal of undesirable substances and particles suspended in the fluid being cleaned.

DESCRIPTION OF THE PRIOR ART

The problems with removing fine particulate material from a fluid, in the form of a liquid or gas, is not readily accomplished by mechanical filters only, since it becomes necessary to use a filter element having very fine pores to pass the fluid. These fine pores can be easily clogged by the particles lodging therein, which in turn increases the resistance to the fluid flow.

As a result of the inherent limitations of mechanical filters, various prior art arrangements have been proposed wherein suspended particles are electrically charged and then are subjected to an electrostatic field so that the particles migrate to and are deposited on a collecting surface. However, these electrostatic field arrangements have also required the incorporation of supplemental mechanical filters. One type of prior art arrangement uses a plurality of spaced apart, oppositely charged plate electrodes coupled to a D.C. voltage source, as shown in U.S. Pat. Nos. 3,252,885; 3,544,441; 3,729,402; 3,852,178; and 3,891,528. Other similar arrangements using a plurality of electrodes are shown in U.S. Pat. Nos. 1,095,893; 3,196,095; 3,484,362; and 3,679,556. Another electrostatic field arrangement is shown in U.S. Pat. No. 4,059,498 wherein particles are removed from a nonconducting liquid.

There has been some attempts to incorporate magnetic fields into the cleaning of fluids. U.S. Pat. No. 3,412,002 discloses the use of an unidirectional magnetic field for removing the emulsified water from the oil. An electric charge is placed on the individual water droplets and deflected by a strong magnetic field. U.S. Pat. No. 3,703,958 discloses the use of two magnetic fields for directing a force on particles in a slurry or sheet.

In U.S. Pat. No. 3,466,154 an electric field is applied in a perpendicular relationship to a magnetic field for classification of particles based on their density, for the purification of molten metal, for casting of ingots and other metal masses, and for boiling of liquid.

SUMMARY OF THE INVENTION

The present invention relates to a fluid processing apparatus and method for removing undesirable elements from a stream of fluid wherein an electric potential, comprising frequency controlled, square wave pulses superimposed over a constant base voltage, is applied to at least an anode electrode plate and a cathode electrode plate. The square wave pulses are employed with a frequency corresponding to the resonant frequency of one of the desirable fluid constituents which is selected to flow pass the electrode plates and not be collected thereon. The cathode electrode plate is composed of a permanently magnetic material so as to provide a magnetic field which is substantially perpendicular to the electric field in a region between the cathode and anode electrode plates. Consequently, the desired constituents of the fluid are accelerated in a helical path with an expanding radius through the region between the electrode plates. More specifically, the application of the square wave pulses at an appropriate resonant frequency accelerates the desired constituents into ever increasing circular rotations so as to pass through the electrode plates without being collected thereon. On the other hand, the undesirable constituents follow a helical path that does not expand, so as to be collected on the cathode electrode plate.

The apparatus and method of the present invention employ a moisture or water coalescer for forming droplets of water and therefore removing the same from the fluid. Moreover, a molecular sieve is used to remove any moisture that may have passed through the coalescer stage.

In a modification to the apparatus and method of the present invention, an electromagnet is centrally mounted in traversing relationship to the electrode plates so as to provide a second magnetic field which is substantially perpendicular to the heretofore described magnetic field in the region between the anode and cathode electrode plates. Consequently, the second magnetic field assists in the acceleration of the undesirable elements to the cathode plate.

BRIEF DESCRIPTION OF THE DRAWINGS

Further objects and advantages of the present invention will become apparent as the following description proceeds, taken in conjunction with the accompanying drawings in which.

DESCRIPTION OF THE PREFERRED EMBODIMENTS

Figure 1:
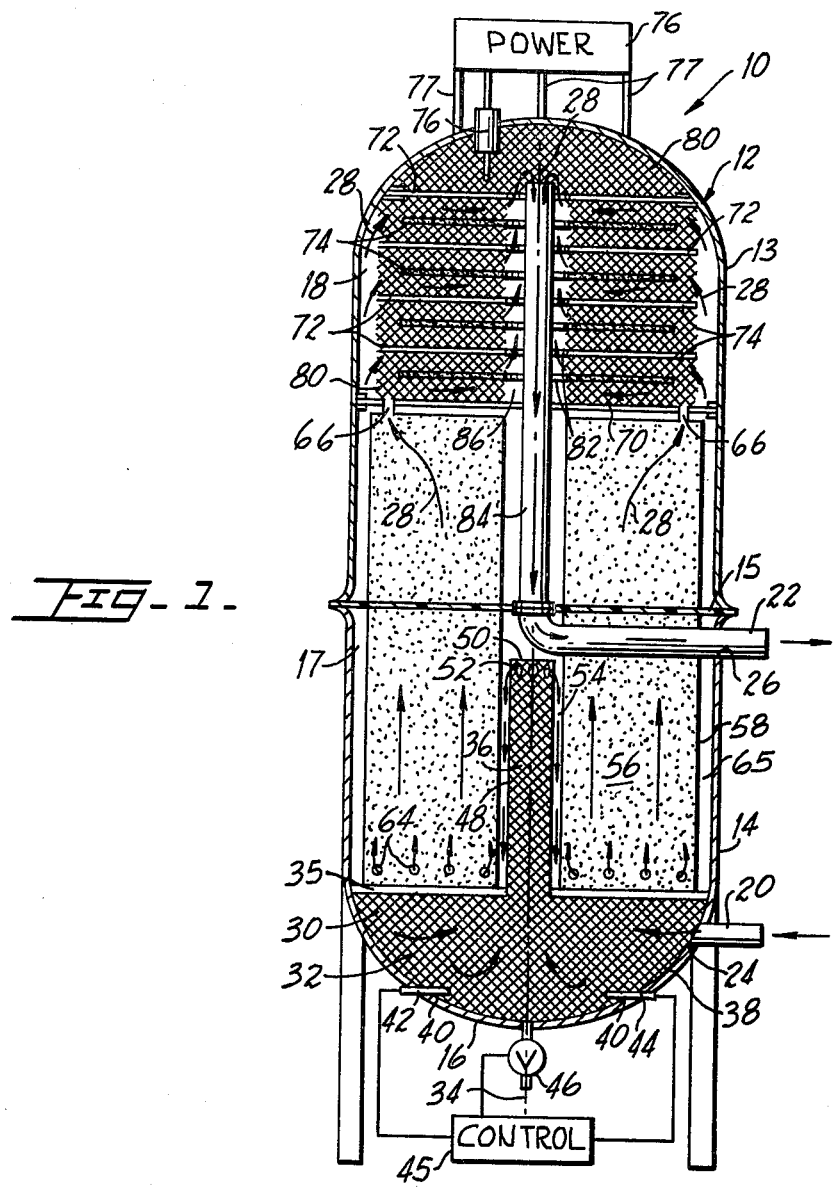
FIG. 1 is a cross-sectional view of a first embodiment of the present invention.

Referring to FIG. 1, there is illustrated a fluid processing apparatus 10 and method for removing foreign substances and particles suspended in a fluid, in the form of a liquid or gas, to be cleaned. Merely for the purposes of illustration only, the preferred embodiments will be described with respect to processing a petrochemical fluid. The apparatus 10 includes a hollow shell 12, preferably having a circular cross-sectional configuration, which conforms to well known design considerations of a pressure vessel. The shell 12 has two portions, an upper portion 13 and a lower portion 14, centrally joined by a gasket seal 15. The two portions 13 and 14 can be separated with respect to each other to provide access to the interior of the shell 12. Preferably, the interior of the shell 12 is divided into three chambers, a lower chamber 16, a middle chamber 17 and an upper chamber 18.

As depicted in FIG. 1, the shell 12 has protruding therefrom, an inlet tube 20 and an outlet tube 22 which define a fluid inlet opening 24 and fluid exit opening 26, respectively. The fluid flow, illustrated by directional arrows 28, is created by a differential pressure between the inlet opening 24 and the exit opening 26. As indicated by the arrows 28, the fluid entering the fluid inlet opening 24 is directed along the bottom, interior walls of the lower chamber 16, due to the orientation of the inlet tube 20 and the pressure applied to the fluid. This fluid movement accomplishes two objectives. First, a friction is created between the fluid and the inner walls of the lower chamber 16 that causes a frictional static precharge to be placed on the components of the fluid. Secondly, this arrangement allows the fluid to penetrate a polypropylene mesh 30. Preferably, the polypropylene mesh 30 has an enlarged portion 32 which has a hemispherical configuration conforming to the concave bottom of the shell 12 and which is centered on a longitudinal axis 34 of the shell 12. The polypropylene mesh 30 preferably has an integrally formed center channel portion 36 extending above the enlarged portion 32 in coaxial relationship with the same on the longitudinal axis 34. Moreover, the center channel portion 36 extends upward into the middle chamber 17, which is separated from the lower chamber 16 by a sealed partition wall 35. By virtue of this arrangement, the fluid penetrates from the outer perimeter 38 of the mesh 30 to the center thereof, thereby providing a relatively maximized exposure time for the fluid with the mesh 30. As is known in the art, the polypropylene material of the mesh 30 presents a different surface tension to any water in the fluid with respect to that presented by, for example, petrochemical fluid components of the fluid. Hence, the water in a liquid, or moisture in a gas, coalesces and migrates to the bottom of the shell 12. When the water that has been collected at the bottom of the shell 12 reaches a fluid level which covers a current sensor 40 mounted in the bottom of the shell 12, a current flows from a current source electrode 42 to a current sensing electrode 44. A control means 45 of conventional design provides a potential between the electrodes 42 and 44, senses the current, and activates an electrically operated drain valve 46. Such electronic activating equipment is well known in the art and need not be described in detail here since its specific construction forms no part of the present invention. When the drain valve 46 is activated to its open condition, the water, and not the separated petrochemical fluid, escapes through the drain valve 46. Once the water level returns to a level lower than the current sensor 40, the drain valve 46 returns to its normally closed condition. This is due to the electrical resistance of the petrochemical fluid, which is much higher in ohmic value than the water, reducing the current flow of the current sensor 40 and thereby triggering the drain valve 46 to its closed condition. The drain valve 46 is preferably located at the lowest point of the shell 12 and may also be used for removing sludge or like foreign material which sifts through the mesh 30 and collects at the bottom of the shell 12.

As illustrated in FIG. 1, the petrochemical fluid continues to migrate upward through the center channel portion 36 into the middle chamber 17. The center channel portion 36 is surrounded by a cylindrical encasement 48 which extends up in fitted relationship to the center channel portion 36 and which terminates in a butt plate 50. Preferably, positioned immediately below the butt plate 50, there is a plurality of holes 52 formed in the encasement 48 in a ring-like configuration. The holes 52 are provided in sufficient quantity and suitable size so as not to present a substantial impedance to the fluid flow. After the fluid is expelled through the holes, it flows downward through an inner annular chamber 54 which surrounds the center channel portion 36. A molecular sieve 56, preferably having a cylindrical configuration, is mounted inside the shell 12 and is disposed in surrounding relationship to the center channel portion 36, so as to define the inner annular chamber 54 therebetween. The molecular sieve 56 has a fluid retaining exterior 58 and is mounted on top of the partition wall 35, which seals off the chamber for the polypropylene mesh 30. Preferably, the molecular sieve 56 is provided in at least three pie shaped portions which have vertically aligned gaps therebetween. A plurality of orifices 64 are formed in the lower portion of the sieve 56, both on its interior side adjacent the center channel portion 36 and on its exterior side adjacent the inner walls of the shell 12. The fluid proceeds down the annular chamber 54 and spreads out through the gaps between pie portions to an outer annular chamber 65. Upon reaching the bottom of the sieve 56, the fluid enters the sieve 56 by way of the orifices 64. As the fluid moves through the molecular sieve 56, any remnants of moisture are removed therefrom. Moreover, the molecular sieve 56 acts as a minute particle filter for removing particulate matter up to 4 angstroms in size. The fluid continues through the sieve 56 to a plurality of exit ports 66 formed in the exterior 58 at the top of the sieve 56.

As shown in FIG. 1, the fluid processing apparatus 10 includes the upper chamber 18 defined by the inner walls of the shell 12 and a fluid retarding partition 70 disposed in traversing relationship to the interior of the shell 12. The exit ports 66 provide fluid communication between the upper chamber 18 and the sieve 56. Contained within the upper chamber 18 is a plurality of spaced apart cathode plates 72 and anode plates 74. More specifically, the series of cathode plates 72 and the anode plates 74 are oppositely charged by a power source 76, with each plate 72 or 74 being alternated with respect to each other so that each successive plate 72 or 74 is of a different type from the preceding plate. Each of the plates 72 and 74 are preferably circular and are centered on the longitudinal axis 34 with their peripheries dimensioned and aligned to be spaced apart from the inner walls of the shell 12. Consequently, the fluid, after proceeding through the exit ports 66, is forced radially outward by the first cathode plate 72 or any other like fluid blocking plate which is positioned above the exit ports 66 and which terminates short of the inner walls of the shell 12. The fluid then proceeds upward along the outer extremeties of the upper chamber 68 adjacent to the inner walls of the shell 12. Subsequently, the pressure of the fluid forces the fluid to flow radially inward between adjacent plates 72 and 74. For the purposes of clarity, the electrical connections are not shown between the positive lead of the power source 76 and the series of anode plates 74 and between the negative lead of the power source 76 and the series of cathode plates 72. The plates 72 and 74 are maintained in spaced apart relationship by the use of a conventional porous dielectric material 80. This material 80 is not intended to provide filtering, but is merely used to provide structural support for the plates 72 and 74. It will be obvious to those skilled in the art that other means for maintaining the plates 72 and 74 in spaced apart relationship are possible. Each of the plates 72 and 74 have a center aperture 82 formed therein. Disposed in coaxial relationship within the apertures 82 is axially disposed fluid removal tube 84 which has its upper extremity protruding upward into the top of the upper chamber 68. The perimeters of the center apertures 82 and the periphery of the fluid removal tube 84 defines a second annular chamber 86 for receiving the fluid flow after it passes from the peripheral extremities of the plates 72 and 74 inward to the center of the plates. The fluid proceeds in an upward direction in parallel relationship with the fluid removal tube 84, and then flows into the tube 84, which is in fluid communication with the outlet tube 22. It should be understood that although the plates 72 and 74 are shown in a horizontal disposition, they could be disposed at any angle, such as a vertical disposition.

Figures 2, 3:
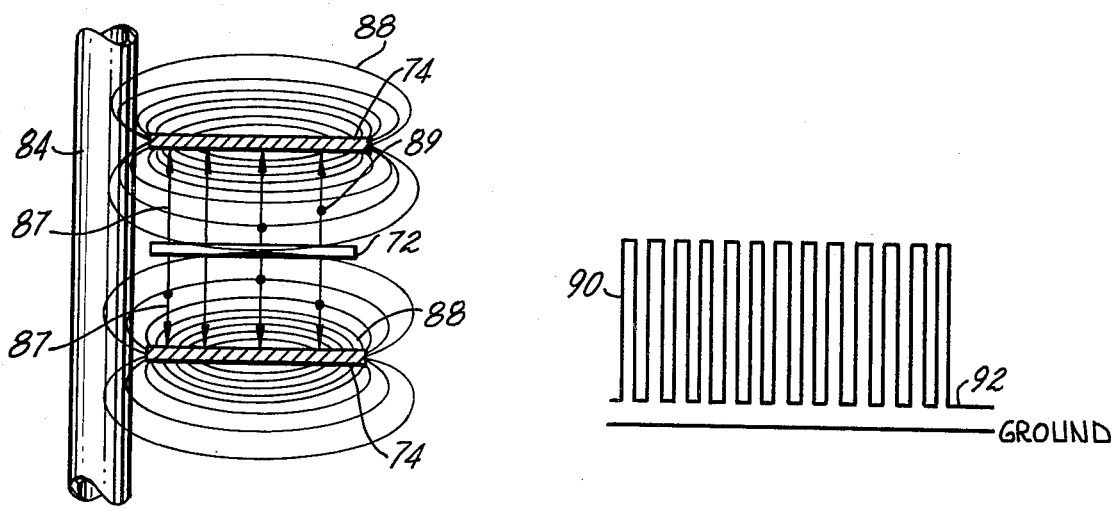
FIG. 2 is an enlarged fragmentary view of a portion of the electrode plates of FIG. 1.
FIG. 3 is a diagrammic view of the electric potential applied to the electrode plates of FIG. 1.

As depicted in more detail in the enlarged fragmentary view of FIG. 2, each of the anode plates 74 is composed of strands of well known foam Nichrome metal and is a hollow, tubular structure so as to create myriad paths of electrical current flow to the potential applied. Hence, the myriad paths give a uniform voltage and a uniform current flow on the entire surface area of such elemental strand. Hence, each of the anode plates 74 forms a porous structure, with the pore sizes being preferably in the vicinity of 40 angstroms. This pore size permits the fluid to pass through the anode plates 74, and in so doing, creates turbulances and exposes a maximum amount of the fluid to the voltage applied by the anode plates 74. The Nichrome foam metal of the anode plates 74 tends to hold the current level steady even in a changing dielectric field. If the D.C. resistance of the fluid were to be reduced, the resistance of the Nichrome metal would tend to increase proportionally to hold the current in a steady state. Hence, the use of the Nichrome metal tends to give a more uniform current flow from cathode plates 72 and the anode plates 74, as shown by illustrative current lines 87. This arrangement is quite useful in that the conductive nature of fluids vary, either from heat or due to their composition. Moreover, to insure that the current drain does not become excessive, the cathode plates 72 can be treated with a combination of cationic and anionic or conductive resin materials that present a resistance of at least 50,000 ohms per square inch to the flow of electricity. It should also be appreciated that the removal of water by polypropylene mesh 30 and the molecular sieve 56 substantially reduces the conductivity of the remaining fluid so as to avoid excessive currents.

Referring to FIG. 2, the cathode plates 72 are composed of a permanently magnetic substance that ideally creates a 200 oersted magnetic field between each of the cathode plates 72 and its adjacent anode plates 74, as shown by magnetic flux lines 88. The cathode and anode plates 72 and 74 are arranged in such a fashion as to allow the adjacent magnetic fields of the cathode plates 72 to intersect and substantially nullify each other at the center of the anode plate 74 disposed between the cathode plates 72. Since all matter is diamagnetic, the particles 89 suspended in the fluid are attracted toward the nearest cathode plates 72. Preferably, but not necessarily, magnetic Vicalloy cathodes are used.

Referring to FIG. 3, the power source 76 provides D.C. square wave pulses 90 which are superimposed over a D.C. base voltage 92. Preferably, the D.C. base voltage 92 is 500 volts and the voltage of the square wave pulses 90 is 25,000 volts to give a maximum peak voltage of 25,000 volts and a minimum voltage of 500 volts. The duration of each square wave pulse 90 is approximately equal to the "off" time of each pulse, hence a 50 percent duty cycle is desirable. Although the frequency can vary, a typical frequency for the square wave pulses 90 would be 1 megahertz. Consequently, a D.C. voltage having a mean average of 12,750 volts above the base voltage 92 is applied and added to the 500 volt base voltage 92 to give a total average D.C. voltage of 13,250 volts for a voltage potential between each adjacent pair of anode plate 74 and cathode plate 72. This applied potential causes the cathode plates 72 to give up a steady flow of electrons, thereby causing the cathode plates 72 to be short of electrons. Hence, the cathode plates 72 are made electrically attractive to all matter that is more positively charged. Consequently, all of the ions and charged particles 89 of contamination are attracted to the plate of opposite polarity. It should be appreciated that the current flow between the plates 72 and 74 charges most of the particles 89 that are suspended in the fluid, causing an attractive force in the direction of the cathode plate 72. Hence, the electrical attraction toward the cathode plates 72 supplements the heretofore described magnetic attraction of the cathode plates 72. Typically the distance between the cathode plates 72 and anode plates 74 can be adjusted to be optimum for the conductivity of the fluid being processed. As will become more apparent hereinafter, the voltages and frequency shown herein are for references only and are variable with the type of fluid being processed.

Referring to FIGS. 2 and 3, the frequency of the square wave pulses is determined by the resonant frequency of the atoms to be accelerated and expelled from the regions between the plates 72 and 74. In other words, the regulation of the frequency and duty cycle of the square wave pulses 90, when superimposed over the constant base voltage 92, produces the desired acceleration of selected ions and/or atoms, forcing them to escape from an ionic barrier or gate that continues to hold agglomerated masses of contaminant particles 89. This ionic barrier or gate is created in the hereinafter described manner. The combination of the magnetic field, which is created by the permanently magnetized cathode plate 72, and the average D.C. voltage field, which is created by the average potential of the D.C. square wave being 90 degrees out of phase with one another, develops the ionic gate. The ionic gate, which creates a lattice-like, particle retaining framework, generally prevents the passage of any matter. However, the frequency of the D.C. square wave is selected to correspond to the resonant frequency of one of the desired constituents of the fluid being processed and is utilized as an accelerating voltage to accelerate the speed and distance of the tightly bound atoms of the fluid. The atoms, when accelerated, travel in a helical path. The frequency rise and fall time of the square wave pulses 90 correspond to the half cycle of the atoms and therefore, further accelerate the atoms on each half cycle, causing the paths of the atoms to increase in speed and distance each time they are accelerated until they are expelled from between the cathode plate 72 and the anode plate 74. Once removed from between the plates, the forces exerted on the atoms are no longer effective and the fluid continues along its normal path under the applied fluid pressure, leaving behind the undesired elements. As previously stated, the undesired elements are attracted by and adhere to the cathode plates 72 by the dual force that is developed by the D.C. current and the magnetic field. More specifically, the undesirable elements agglomerate into larger masses and are directed through electrophoresis toward the cathode plate 72. The agglomeration of atoms and ions into particle and particle mass is accomplished through the electrochemical process of covalent bonding of the atoms and ions to one another. The bonding is considered to be close packed and allows for very little fluid to exist between them as they form solid particles. The entrapment of such particles is accomplished by electron current flow causing them to plate or adhere to the cathode plates 74. As is well known, the metallic atom will readily time share its electron valence with the electron valence of a non-metallic atom, causing a covalent bond between the two, hence, agglomeration and adhesion to the cathode plate 74 is caused. On the other hand, the accelerated ions/or atoms escape the ionic barrier, flow into the second annular chamber 86, then flow into the fluid removal tube 84 and exit from the shell 12, void of contaminants and moisture. The dielectric material 80, which is used as a porous spacer and is formed of a dielectric material is not shown in FIG. 2 for the purposes of clarity. The material 80 holds the plates 72 and 74 in place and prevents possible short circuiting between the plates.

Referring to FIG. 3, as already explained, the magnetic field produced by the cathode plates 72 has a phase differential of substantially 90° with respect to the relatively uniform electric field between the plates 72 and 74. By the term "phase", it is meant that the angle of the magnetic flux lines 88 are substantially at right angles to the force lines of the electric field, such electric force lines being parallel to the current lines 87. The fluid flows with a drift velocity in a direction substantially parallel with the plates 72 and 74. However, it should be appreciated, as shown in FIG. 3, that the magnetic flux lines 88 are not, in all regions of the plate, exactly perpendicular to the electric force lines. Hence, the relationship between the two fields will be described as being "substantially angled" or "nearly perpendicular".

Referring to FIG. 1, the employment of the polypropylene mesh 30 and the molecular sieve 56 may be optional with some utilizations of the present inventions and even undesirable with other utilizations. For example, when the fluid comprises an aqueous, alkline or acidic solution, the mesh 30 and sieve 56 are omitted. It should be understood that the primary function of the sieve 56 is to remove moisture from the fluid. The resultant effect is to have a fluid that has less than 15 parts per million of water. However, the molecular sieve 56 also acts as a minute filter for removing particles up to 4 angstroms in size. The mesh 30 is typically provided with pores of approximately 0.045 inches, and dodecahedron in shape, so as to permit the passage of a dielectric fluid, which simultaneously presenting a surface tension to moisture, causing water droplets to form and to drop to the bottom of the shell 12, due to the differential of specific gravity existing between the two fluids. The shell 12 defines a tank whose size is suitably determined based upon the quantity of fluid to be processed and purified per minute.

Although the embodiment of FIG. 1 is shown in the upper chamber 18 with the fluid flowing radially inward, the fluid could be introduced centrally so that it flows radially outward. Such outward flow will be illustrated in an alternative embodiment to be described hereinafter.

Figure 4:
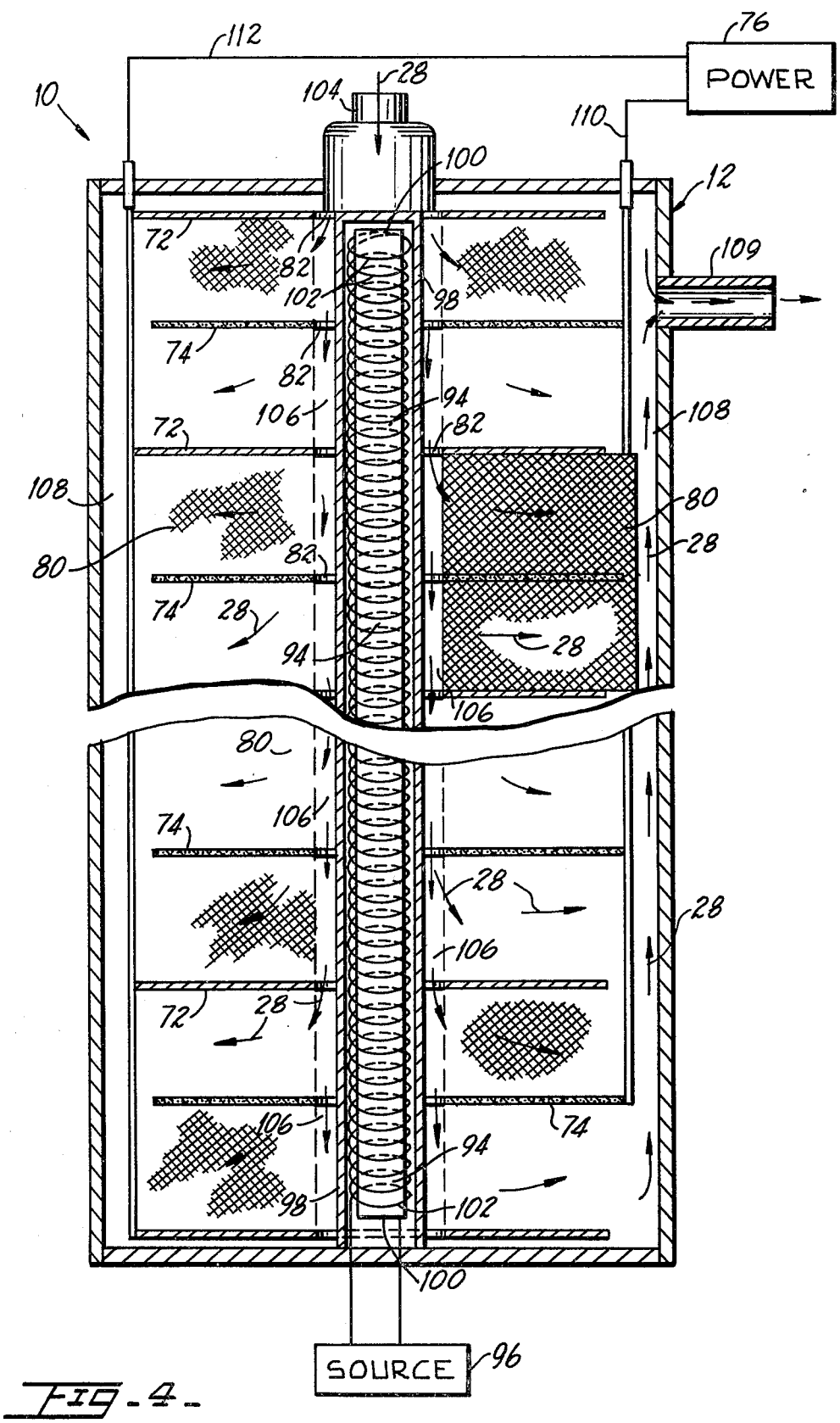
FIG. 4 is a cross-sectional view of a second embodiment of the present invention.

FIG. 4 shows an alternative embodiment of the present invention wherein a centrally disposed electromagnetic 94 is electrically connected to a variable frequency voltage source 96 which generates D.C. square wave pulses. The magnetic field created by the electromagnet 94 supplements the magnetic field created by the cathode plate 74. The arrangement of anode plates 74 and cathode plates 72, along with the power source 76 providing square wave pulses 90 superimposed over a D.C. base voltage 92, remains the same as in the embodiment shown in FIGS. 1, 2 and 3. The electromagnet 94 is added to the apparatus 10 for the purpose of boosting or increasing the acceleration of the undesired elements to the cathode plates 72. This is particularily useful when the fluid being processed is an aqueous solution containing human waste. When processing an aqueous solution, the arrangement shown in FIG. 4 is sufficient. On the other hand, it should be understood that the arrangement of FIG. 4 could be substituted for the cathode-anode arrangement found in the upper chamber 18 of the embodiment shown in FIG. 1. In this latter case, the polypropylene mesh 30 and the molecular sieve 56 would be incorporated into the embodiment of FIG. 4.

Referring to FIG. 4, the electromagnet 94 is encased in a cylindrical plastic container 98 which insulates the electromagnet 94 from the fluid being processed. The electromagnet 94 and the container 98 are coaxially disposed with respect to each other on the longitudinal axis of the shell 12. The electromagnet 94 comprises a conventional iron core 100 and coil 102 arrangement. The voltage source 96 provides square wave pulses which are in phase with the square wave pulses 90 generated by the power source 76. As with the first embodiment of FIG. 1, the dielectric material 80 provides a porous spacer between adjacent plates 72 and 74. The magnetic field generated by the electromagnet 94 has a phase differential of approximately 90 degrees with respect to the magnetic field of the cathode plates 72. With both magnetic fields of the present invention, when the description of "a phase differential of approximately or substantially 90 degrees" is used, it is meant that the magnetic field between at least a majority portion of adjacent plates 72 and 74 are substantially perpendicular to the electric field or the other magnetic field, as the case may be. By the magnetic field and the electric field being substantially perpendicular, it is meant that the flux lines of the magnetic field and the force lines of the electric field are approximately or substantially at right angles to each other between the plates 72 and 74.

As shown in FIG. 4, merely for the purposes of illustration, the fluid flow is reversed with respect to that found in the embodiment of FIG. 1. More specifically, the fluid centrally enters the shell 12 through a fluid inlet 104 mounted at the top of the shell 12. The fluid then descends into an inner annular chamber 106 formed by the exterior of the container 98 and the center aperture 82 of the plates 72 and 74. The fluid subsequently spreads out radially between the plates 72 and 74, with the accelerating and retarding effects being implemented on the fluid in the same manner as previously described, but with the assistance of the added magnetic field. The fluid then enters an outer annular chamber 108 and exits, after being purified, through an outlet tube 109. Although not shown in the first embodiment of FIG. 1 for the sake for clarity, the electrical connections between the power source 76 and the plates 72 and 74 are now shown in the embodiment of FIG. 4. Preferably, the anode plates 74 are horizontally offset with respect to the cathode plates 72 so that each series of the same type plate extends outward on opposed sides to receive the positive lead 110 or the negative lead 112.

Referring to the FIGURES in general, in operation the desired constituents of the liquid being processed are accelerated by the application of the square wave pulses 90. Generally, the various charged constituents are proceeding toward the cathode plate 72 in a helical path caused by the perpendicular relationship between the magnetic field and the electric field. With the application of the square wave pulses 90 having a frequency corresponding to the resonant frequency of the desired constituents, the desired constituents of the fluid proceed in a helical path with an ever increasing radius. At the same time the center of these helical paths will be moved by the drift velocity of the fluid. Hence, the expanding helical path has an increasing radius with respect to the center of the helical path. With the increasing circular rotation of the desired constituents caused by the expanding radii, they pass from beneath the plates so as to have the influence of the combination of magnetic and electric fields terminated; thereby allowing the desired constituents to flow through the annular chamber 86, to be subsequently collected for its desired use. The desired constituents comprise that portion of the fluid which is to be purified by the apparatus 10 and subsequently collected through the fluid outlet tube 22. On the other hand, the undesirable elements or constituents of the fluid being processed follow helical paths that do not expand in their rotational orbit. Hence, these undesirable elements remain between the electrode plates for a sufficient time duration that they agglomerate and are collected on the cathode plates 72 and removed from the fluid.

Although particular embodiments of the invention have been shown and described here, there is no intention to thereby limit the invention to the details of such embodiments. On the contrary, the intention is to cover all modifications, alternatives, embodiments, usages and equivalents of the subject invention as fall within the spirit and scope of the invention, specification and the appended claims.

What is claimed is:

1. In an apparatus for removing undesirable elements from a stream of fluid wherein said apparatus includes at least one pair of parallel electrode plates spaced apart to permit the fluid to flow therebetween, means for establishing an electric potential between said pair of electrodes plates to maintain an electric field therebetween, the improvement comprising:
    means for providing a magnetic field which is substantially perpendicular to the electric field in a region between the pair of electrode plates,
    the means for establishing the electric potential comprising a source of frequency controlled, square wave pulses superimposed over a constant base voltage,
whereby the undesirable elements are accelerated in a helical path toward one of the pair of electrodes.

2. In the apparatus of claim 1,
said means for providing a magnetic field comprising one of the pair of electrode plates comprising a cathode electrode plate composed of a permanently magnetic material.

3. In the apparatus of claim 2,
the other electrode plate of said pair of electrode plates comprising an anode electrode pulse formed of a Nichrome foam metal.

4. In the apparatus of claim 3,
said cathode electrode plate comprising a circular disk having a center aperture centrally formed therein.

5. In the apparatus of claim 1,
an electromagnet for providing a second magnetic field, between the pair of electrode plates, which is substantially perpendicular to the magnetic field generated by said means for establishing a magnetic field substantially perpendicular with the electric field, said second magnetic field being substantially parallel with the force lines of the electric field.

6. In the apparatus of claim 5,
each of said pair of electrode plates comprising a circular disk having apertures centrally formed therein, said apertures being disposed in coaxial relationship with each other,
said electromagnet being disposed within said apertures with the longitudinal axis of the electromagnet's core being disposed in traversing relationship to the electrode plates.

7. In the apparatus of claim 1,
said apparatus further comprising a hollow shell having a fluid inlet and fluid outlet.

8. In the apparatus of claim 7,
a water coalescer formed of a porous polypropylene material,
said water coalescer being disposed in fluid receiving relationship with said fluid inlet and disposed in fluid delivering relationship to said pair of electrode plates.

9. In the apparatus of claim 8,
current sensing means mounted toward the bottom of the shell for sensing the level of water accumulated in the bottom of the shell and operative for generating a triggering signal when the water reaches a predetermined level,
a drain valve disposed at the bottom of the shell and operative to open in response to the triggering signal from said current sensing means.

10. In the apparatus of claim 7,
a molecular sieve disposed in fluid receiving relationship with said fluid inlet and disposed in fluid delivering relationship with said pair of electrodes.

11. In the apparatus of claim 7,
a water coalescer being interposed in fluid processing relationship between said fluid inlet and said molecular sieve, said water coalescer being formed of a porous polypropylene material.

12. In the apparatus of claim 1,
said source of square wave pulses including means for providing the square wave pulses with a frequency corresponding to the resonant frequency of one of the desirable constituents of the fluid which is selected to flow pass the electrode plates and not be collected thereon.

13. In the apparatus of claim 4,
said anode electrode plate having a pair of said cathode electrode plates on opposed sides thereof, whereby the respective magnetic fields of said pair of cathode electrode plates substantially cancel each other at said anode plate.

14. A method of removing undesirable elements from a stream of fluid wherein the stream of fluid flows between at least one pair of electrode plates, the improvement comprising:
    applying a magnetic field in a direction substantially perpendicular to the electric field in a region between the pair of electrode plates,
    applying an electric potential to said pair of electrode plates in the form of a source of frequency controlled, square wave pulses superimposed over a constant base voltage,
    setting the frequency of the square wave pulses to correspond to the resonant frequency of one of the desired constituents of the fluid which is selected to flow pass the electrode plates and not collected thereon.

15. In the method of claim 14,
applying a second magnetic field between the pair of electrode plates so that the second magnetic field is substantially parallel with the electric field in the region between the pair of electrode plates.

16. In the method of claim 14,
passing the fluid through a water coalescer prior to flowing the fluid into the pair of electrode plates.

17. In the method of claim 14,
passing the fluid through a molecular sieve prior to flowing the fluid into the pair of electrode plates.

18. In the method of claim 17,
passing the fluid through a water coalescer prior to flowing the fluid into a molecular sieve.

* * * * *